United States Patent
Robinson et al.

(10) Patent No.: US 9,903,933 B2
(45) Date of Patent: Feb. 27, 2018

(54) SPACE TIME INTERLEAVED MATCHED-FILTERS

(71) Applicant: RAYTHEON COMPANY, Waltham, MA (US)

(72) Inventors: Ian S. Robinson, Redondo Beach, CA (US); Bradley A. Flanders, Whittier, CA (US)

(73) Assignee: RAYTHEON COMPANY, Waltham, MA (US)

( * ) Notice: Subject to any disclaimer, the term of this patent is extended or adjusted under 35 U.S.C. 154(b) by 250 days.

(21) Appl. No.: 14/843,346

(22) Filed: Sep. 2, 2015

(65) Prior Publication Data

US 2017/0059684 A1    Mar. 2, 2017

(51) Int. Cl.
| | | |
|---|---|---|
| G01S 3/16 | (2006.01) | |
| G01S 3/28 | (2006.01) | |
| G01S 3/32 | (2006.01) | |

(52) U.S. Cl.
CPC ..................... *G01S 3/32* (2013.01)

(58) Field of Classification Search
CPC ................. G01S 3/16; G01S 3/28; G01S 3/32
USPC .......................................... 342/383
See application file for complete search history.

(56) References Cited

U.S. PATENT DOCUMENTS

| | | |
|---|---|---|
| 7,394,424 B1 | 7/2008 | Jelinek et al. |
| 7,705,761 B2 | 4/2010 | Tietjen et al. |
| 8,203,472 B2 | 6/2012 | Robinson |
| 2006/0022866 A1* | 2/2006 | Walton ............... G01S 7/352 342/194 |
| 2017/0102445 A1* | 4/2017 | Mesecher ............ G01S 3/32 |

OTHER PUBLICATIONS

Curtis et al., "Current Capabilities of Digital Beamforming," Air Force Research Laboratory, pp. 1-33, Sep. 21, 2007.

* cited by examiner

*Primary Examiner* — Harry K Liu
(74) *Attorney, Agent, or Firm* — Lewis Roca Rothgerber Christie LLP

(57) ABSTRACT

A system for determining a direction for an electromagnetic signal. The system includes a receiving array antenna, including a plurality of antenna elements, each antenna element having a position in the receiving array antenna; a digitizer configured to receive an analog signal from each of the antenna elements, and to sample and digitize each of the analog signals to form a sequence of digitized samples from each of the analog signals; and a processing unit. The processing unit is configured to receive the sequences of sample values from the digitizer; and, for each direction of a plurality of hypothesized directions: combine the sample values from the plurality of antenna elements to form a single time record; fit the single time record with a combination of one or more functions of time; and identify a direction at which a measure of the magnitude of the linear combination is greatest.

20 Claims, 11 Drawing Sheets

SPACE TIME INTERLEAVED MATCHED-FILTERS

CROSS-REFERENCE TO RELATED APPLICATION(S)

This application is related to and incorporates by reference in its entirety, as if set forth in full, U.S. Pat. No. 8,203,472, entitled "COMPENSATION OF CLOCK JITTER IN ANALOG-DIGITAL CONVERTER APPLICATIONS" (the "'472 Patent").

BACKGROUND

1. Field

One or more aspects of embodiments according to the present invention relate to receivers, and more particularly to a system for processing signals from a receiving array antenna.

2. Description of Related Art

Array antennas may be used to receive signals with a directional receive beam by suitably combining the signals from antenna elements of the array antenna. Some related art techniques involve applying a phase shift or time delay to the signal from each antenna element, the phase shift or time delay corresponding to the phase shift of an expected signal from antenna element to element in the direction of the receive beam. If the signals are first converted to digital form, the process of time delay may employ interpolation to estimate signal amplitude at a time other than the actual sampling times, which may be computationally costly and which may introduce numerical errors (the estimate of amplitude may be imprecise). Moreover, a sampling frequency at least equal to the Nyquist frequency may be required in some cases, to avoid replication of signals in unexpected frequency bands (e.g. aliasing); if the Nyquist frequency is relatively high, sampling at this rate may be challenging or costly. The Nyquist frequency may be twice the highest frequency of the sampled frequency band or if the signal is analog bandpass sampled the Nyquist frequency may be closer to twice the bandwidth of the sampled frequency band. Thus, there is a need for a flexible system for processing signals from a receiving array antenna that is compatible with sampling at frequencies lower than the Nyquist frequency.

SUMMARY

According to an embodiment of the present invention there is provided a system for determining a direction for an electromagnetic signal, the system including: a receiving array antenna, including a plurality of antenna elements, each antenna element having a position in the receiving array antenna; a digitizer configured to receive an analog signal from each of the antenna elements, and to sample and digitize each of the analog signals to form a sequence of digitized sample values from each of the analog signals; a processing unit, configured to: receive the sequences of sample values from the digitizer; for each direction of a plurality of hypothesized directions of the signal: combine the sample values from the plurality of antenna elements to form a single time record, the combining including: calculating an adjusted sampling time for each of the sample values, based on at least: the position in the array antenna of the antenna element corresponding to the sample value; and the hypothesized direction of the signal; and fit the single time record with a combination of one or more functions of time.

In one embodiment, the processing unit is configured to fit a sine function and a cosine function to the time record by performing a linear least squares fit.

In one embodiment, the processing unit is further configured to identify a direction for which a measure of the magnitude of the combination is greatest.

In one embodiment, the fitting of a linear combination of a sine function and a cosine function to the time record includes finding a coefficient for the sine function and a coefficient for the cosine function, and wherein the measure of the magnitude of the combination is the sum of: the square of the coefficient for the sine function, and the square of the coefficient for the cosine function.

In one embodiment, the digitizer is configured to sample and digitize each of the analog signals by: sampling each of the analog signals at a plurality of sampling times, each sampling time having a sampling time offset relative to a uniform sequence of points in time, the sampling time offset varying with time by at least 10% of the difference between a first sampling time of the plurality of sampling times and a second sampling time of the plurality of sampling times immediately following the first sampling time.

In one embodiment, during a first time interval, the sampling time offset increases monotonically or decreases monotonically.

In one embodiment, the digitizer is further configured to measure the sampling time for each of the sequence of sample values, and wherein the calculation of an adjusted sampling time for each of the sample values is further based on the measured sampling time for the sample value.

In one embodiment, the digitizer includes a clock and a voltage-controlled delay circuit connected to an output of the clock, the digitizer configured to sample the analog signals at sampling times corresponding to edges in a clock signal at an output of the voltage-controlled delay circuit.

In one embodiment, the digitizer includes a noise source, an output of the noise source being connected to a control input voltage-controlled delay circuit.

In one embodiment, the digitizer further includes a circuit configured to measure the output of the noise source and to estimate a corresponding sampling time offset.

In one embodiment, the processing unit is configured to fit the single time record with a set of functions corresponding to a plurality of hypothesized frequencies, and to identify power of the plurality of hypothesized frequencies corresponding to a best fit to the single time record.

In one embodiment, the system includes a signal chain including an antenna element of the plurality of antenna elements and connected to an input of the digitizer, the signal chain having an upper frequency and a lower frequency, wherein the digitizer is configured to undersample.

In one embodiment, the signal chain includes an analog filter having an upper filter frequency equal to the upper frequency, and a lower filter frequency equal to the lower frequency.

In one embodiment, the system includes: a first sampling time, a second sampling time, and a third sampling time, the first sampling time, the second sampling time, and the third sampling time being consecutive, the length of the interval between the first sampling and the second sampling time differing from the length of the interval between the second sampling time and the third sampling by more than 10% of the length of the interval between the first sampling and the second sampling time.

In one embodiment, the processing unit is configured to measure the power of signals arriving from a hypothesized direction without performing interpolation.

According to an embodiment of the present invention there is provided a method for determining a direction for an electromagnetic signal, the method including: receiving a plurality analog signals, from a receiving array antenna, the receiving array antenna including a plurality of antenna elements, each antenna element having a position in the receiving array antenna, each of the analog signals corresponding to one of the antenna elements; digitizing each of the analog signals at a plurality of sampling times, to form a plurality of sequences of digitized sample values, each of the sequences of sample values corresponding to one of the analog signals; for each direction of a plurality of hypothesized directions of the signal: combining the sample values from the plurality of antenna elements to form a single time record, the combining including: calculating an adjusted sampling time for each of the sample values, based on at least: the position in the array antenna of the antenna element corresponding to the sample; and the hypothesized direction of the signal; and fitting the single time record with a combination of one or more functions of time.

In one embodiment, the method includes identifying a direction for which a measure of the magnitude of the combination is greatest.

In one embodiment, the method includes processing an analog signal of the plurality analog signals with a signal chain before digitizing the analog signal, the signal chain having an upper frequency and a lower frequency, wherein the digitizing of the analog signal includes digitizing the analog signal with a sampling rate less than twice the difference between the upper frequency and the lower frequency.

In one embodiment, the digitizing of each of the analog signals includes: sampling each of the analog signals at a plurality of sampling times, each sampling time having a sampling time offset relative to a uniform sequence of points in time, the sampling time offset varying with time by at least 10% of the difference between a first sampling time of the plurality of sampling times and a second sampling time of the plurality of sampling times immediately following the first sampling time.

In one embodiment, the method includes measuring the sampling time for each of the sequence of sample values, and wherein the calculation of an adjusted sampling time for each of the sample values is further based on the measured sampling time for the sample.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of that a system of space time interleaved matched-filters provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
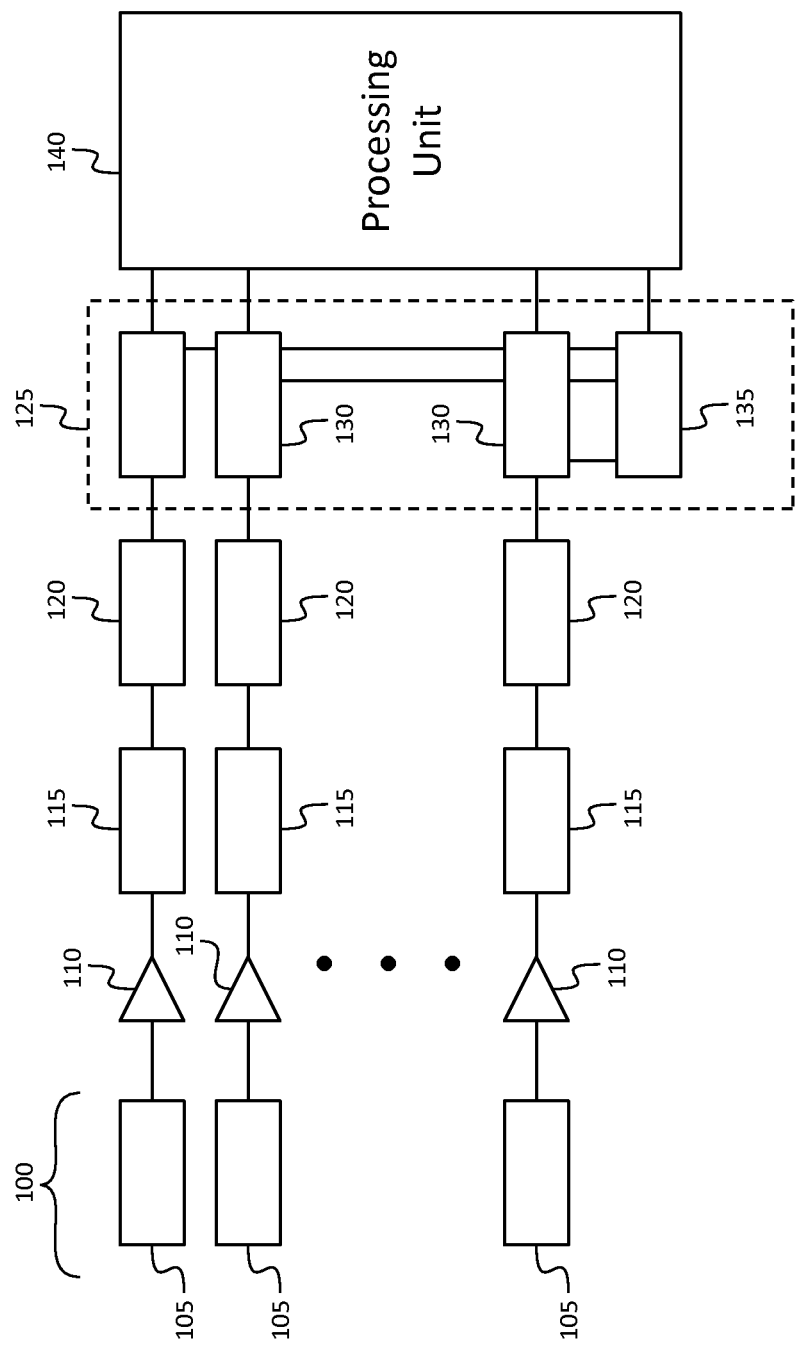
FIG. 1 is a block diagram of an array antenna, with an array of signal chains and a processing unit, according to an embodiment of the present invention.

Referring to FIG. 1, in one embodiment, a scanning receiver includes an array antenna 100 including an array of antenna elements 105. Each antenna element 105 is configured to receive an electromagnetic signal propagating in free space and to convert this free space signal into a guided signal, propagating for example in a waveguide, transmission line, or coaxial cable. The output of each antenna element 105 is referred to herein as a received radio frequency (RF) signal, which is a signal that may be at any frequency for which the array antenna may be configured, e.g., from 100 kHz to 100 GHz. The array antenna may be capable of operating within a smaller range of frequencies spanning two octaves or less, e.g., from 5 GHz to 20 GHz. In some embodiments, the frequency range of the antenna may be wider, e.g. 2-20 GHz. Each antenna element 105 is connected to a low noise amplifier 110, the output of which is connected to a frequency converter 115, which may include, for example, a local oscillator and a mixer. The output of the frequency converter 115, which may be referred to as an intermediate frequency (IF) signal, is connected to a filter 120 (e.g., a band-pass filter or a low-pass filter), the output of which is connected to a digitizer 125. The signal chain from the input of an antenna element 105 to the corresponding input to the digitizer 125 may have a gain that varies with frequency, having a maximum gain at a first frequency, and one or more 3 dB frequencies at which the gain decreases to a value 3 dB less than the maximum gain. The highest of these 3 dB frequencies is referred to herein as the "upper frequency" of the signal chain, and the lowest frequency (or DC, if there is no 3 dB frequency below the first frequency) is referred to herein as the "lower frequency" of the signal chain. In some embodiments, a frequency converter is not employed, and the low noise amplifier 110 is directly connected to an analog to digital converter.

The digitizer 125 may include a plurality of analog to digital converters 130, one per antenna element 105, as illustrated in FIG. 1. In other embodiments the digitizer 125 may include fewer analog to digital converters, e.g., it may include a single multiplexed analog to digital converter. The digitizer 125 also includes an element, referred to herein as a "sampling time controller" 135 that controls (e.g., by triggering sampling in the one or more analog to digital converters 130) the points in time, referred to herein as sampling times, at which the analog signals are sampled for digitization. The sampling time controller 135 is connected to a clock input of each analog to digital converter 130 and provides a sampling clock signal to each analog to digital converter 130. The sampling time controller 135 may for example be a clock, connected, through a clock tree, to all of the analog to digital converters 130. In some embodiments the sampling time controller 135 may include a plurality of separate components, e.g., it may consist of a collection of clock oscillators, one for each analog to digital converter 130. The sampling time controller 135 may contain a clock, e.g., an oscillator, and circuitry for adjusting (e.g. jittering or linearly changing) the frequency or phase of the oscillator, so that the sampling times are not uniformly spaced in time. As used herein, a digitizer is a circuit that converts a plurality of analog signals into one or more digital data streams that contain digital representations of samples of the analog signals, and may also contain information about the sampling times (e.g. time tags).

Each analog to digital converter 130 receives a sampling clock, and samples the input analog signal at each falling edge (or at each rising edge or at the peak) of the sampling clock, and then converts the sampled analog signal to a digital signal. The output of the analog to digital converter 130 is a digital data stream including a sequence of measured sampled values, each value being measured at a sampling time, representing the sequential samples of the analog signal. The output of the digitizer 125 includes all of these data streams and may also include a parallel set of data streams including information about the sampling time for each sample, e.g., a sampling time offset for each of the sequential samples. The output of the digitizer 125 is fed to a processing unit 140. The data streams may be transmitted over separate physical connections as illustrated in FIG. 1, or they may be consolidated into a single composite data stream and transmitted over a single physical channel.

In some embodiments some of the above-listed elements are omitted. For example, the frequency converter 115 and the filter 120 may be omitted, and the RF signal may be sampled directly with a sampling rate greater than or equal to the Nyquist frequency for the RF signal, i.e., a sampling rate greater than or equal to twice the highest received RF frequency. Such sampling at a rate at least equal to the Nyquist frequency may be referred to as critical sampling when it is more than twice the highest frequency sampled and bandpass sampling when it the signal is bandlimited by passing it through an analog filter prior to sampling. Bandpass sampling allows a lower sampling rate than critical sampling but at least twice as high as the bandlimited bandwidth.

In yet another embodiment, employing a process referred to herein as undersampling, the RF signal (or the IF signal, if a frequency converter 115 is employed), or the filtered RF signal or the filtered IF signal may be sampled with a sampling rate less than the Nyquist frequency for the RF frequency or for the bandwidth of the band-pass filter 120. In some embodiments the upper and lower frequencies of the signal chain are set by elements other than a band-pass filter 120 and undersampling may correspond to sampling with a sampling rate less than twice the difference between the upper frequency and the lower frequency of the signal chain. The undersampling may be advantageous as lower power devices may be used to sample signals, overall data rates may be lower, and the resulting signals may not contain aliases.

In one embodiment the processing unit 140 performs both beamforming and frequency analysis. The beamforming process involves forming an output that is a linear combination of the signals from the various antenna elements 105 with a respective time delay for each antenna element 105 (referred to herein as "per-element delay"), corresponding to a beam direction from which a free-space signal may be received.

Figure 2:
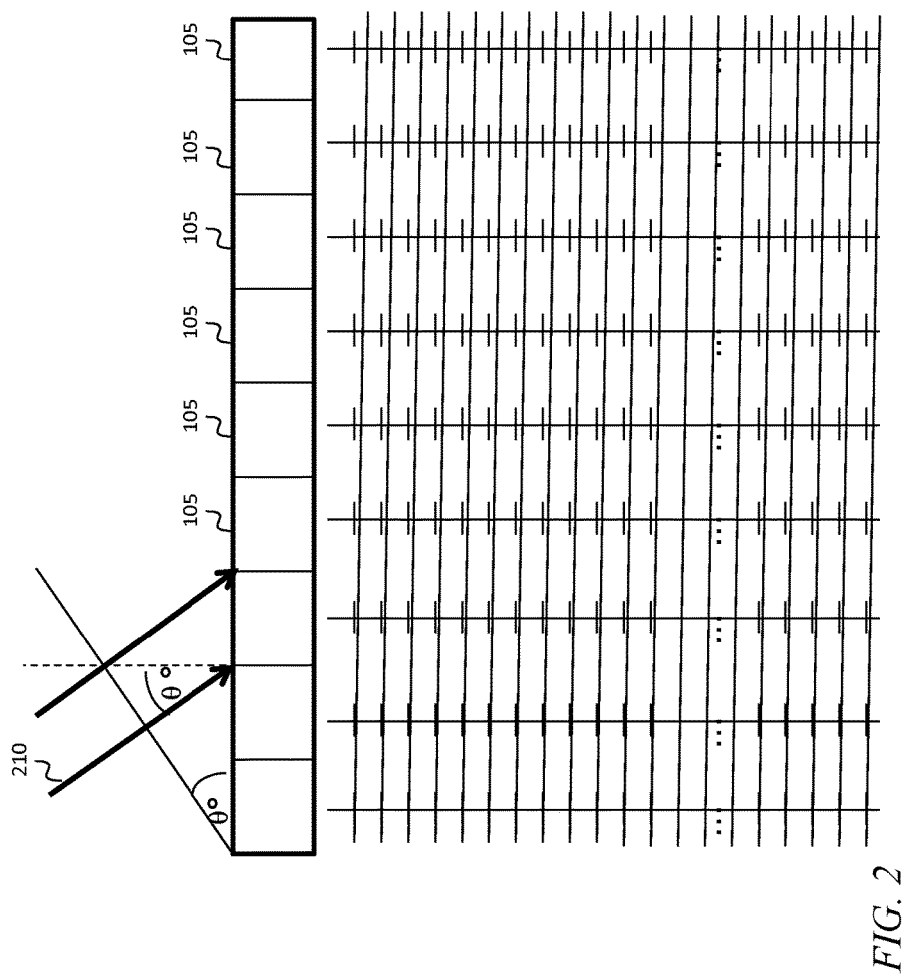
FIG. 2 is a schematic signal flow diagram of an array antenna, with an illustration of a timeline for each element, according to an embodiment of the present invention.

In one embodiment, beamforming and frequency analysis are conducted in a single process, in which samples from the antenna elements 105 are interleaved and collapsed into one time series, each member of the time series having a measured amplitude and a sampling time. Referring to FIG. 2, in one embodiment, beamforming may be employed to point the array in a direction 210, i.e., to preferentially receive free space signals arriving from the direction 210. For example, if the antenna elements 105 are sampled simultaneously, a sample from one element at one point on the array may be delayed relative to another element, at another point in the array, by an amount equal to the difference in travel time for an electromagnetic free-space plane wave arriving from the direction 210. The frequency content of the resulting time series may then be characterized, as described in further detail below.

Figure 3:
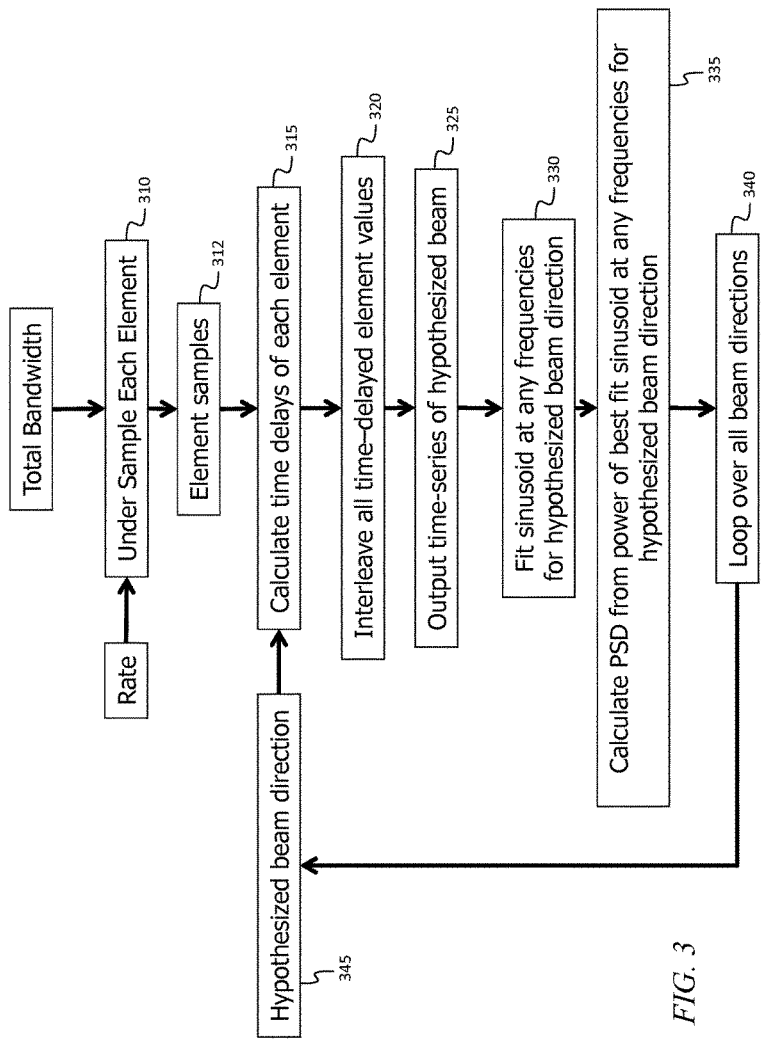
FIG. 3 is a flow chart of a method of measuring a set of received power spectral densities, over a range of frequencies and a range of beam directions, according to an embodiment of the present invention.

This process may result in an estimate of the magnitude (e.g., power or amplitude) of a free space signal arriving from a specified (or "hypothesized") direction. By varying the delay, the receiver may scan direction to search for signals. At any set of time delays, the process may be extended to test how much of any frequency(ies) are present. A computation of amplitude and/or phase of measured frequency(ies) are available from the process. Referring to FIG. 3, in one embodiment the process begins, as mentioned above, with sampling, e.g., undersampling, the analog signal in a step 310, to form a set of element samples 312. A time delay is calculated, in a step 315, for each element, based on a hypothesized beam direction (i.e., a direction being tested), all the sampling times from the antenna elements 105 are adjusted by the delay in a step 320 but no change is made to the measured amplitudes, the respective time series from the antenna elements are interleaved and collapsed into a single time series, and the resulting time series is output, i.e., fed to a subsequent processing step or module, in a step 325. The time series may be a set of data points, each of which is an ordered pair including an adjusted, delayed sampling time and an unmodified sampled value. Since this process does not modify the sampled value there may be no loss of precision.

The data stream from the digitizer 125 for each antenna element 105 may include a sequence of data samples, and an accompanying sequence of sampling times. These parallel streams may be considered to represent a sequence of data points, each data point including a sampling time, and a sampled value (the digital value of the sampled analog signal). Each sequence of data points is delayed (or adjusted) to form a sequence of adjusted data points, and the sequences are combined. Related art processes may involve interpolation, which may involve adjusting the sampled value or substituting for it an adjusted sample value. By contrast, in embodiments of the present invention, the process of adjusting or delaying a data point may involve only adjusting (i.e., increasing or decreasing) the sampling time to form an adjusted sampling time, without adjusting the sampled value. This adjustment corresponds to translating (i.e., sliding) the data points of a time series horizontally on a graph of sampled values versus time.

The combination of adjusted data streams from the several antenna elements 105 may be formed by interleaving, e.g., taking a first adjusted data point from a first antenna element 105, appending a first adjusted data point from a second antenna element 105, and so on, up to a last antenna element 105, and then appending a second adjusted data point from the first antenna element 105, appending a second adjusted data point from a second antenna element 105, and so on, until a certain number of samples, e.g., 512 samples, from each antenna element 105 are in the interleaved and collapsed time series. The result of this combination may be represented as a vector of adjusted sampling times, or "adjusted sampling time vector" and a vector of corresponding sampled values, or "sampled value vector". In one embodiment the vectors are sorted so that the values of the elements of the adjusted sampling time vector increase monotonically (e.g., in the collapsed and interleaved data set the adjusted data points may be stored (e.g., in computer memory) in order of increasing adjusted sampling time). In some embodiments the adjusted data streams from the several antenna elements 105 may be combined by concatenating instead of interleaving, e.g., taking 512 adjusted data points from a first antenna element 105 appending 512 adjusted data points from a second antenna element 105, and so on.

In one embodiment, the frequency content of the resulting time series is characterized. A measure of the magnitude of the signal, e.g. the signal power is tested at a plurality of test frequencies, the testing being done by fitting a signal pattern to the sampled data. One approach is to use quadrature sinusoids, e.g., a linear combination of a sine function at the test frequency and a cosine function at the test frequency, fit to the time series, in a step 330. The fitting may include computing the values of the pattern at the known (adjusted) time samples and multiplying the pattern value by the measured sample value. Or it may be performed as a linear least squares fit to a sine function and a cosine function, or to a sine function, a cosine function, and a constant. For example, a matrix X may be formed having as a first row the cosine function evaluated at each of the sampling times in the sampling time vector, and as a second row the sine function evaluated at each of the sampling times in the sampling time vector. The 2-element vector of coefficients b may then be found by solving the linear equation:

$$X^T X b = X^T a$$

where a is the sampled value vector.

The fit may result in a sine amplitude and a cosine amplitude (being the coefficient of the sine function and the coefficient of the cosine function respectively). The square root of the power at the test frequency may then be calculated to be (or to be proportional to) the quadrature sum of the coefficients (square root of the sum of the squares of the two coefficients (i.e., of the cosine and sine coefficients)). Phase may be calculated by computing the arctangent of the ratio of the sine term to the cosine coefficient. The test of power or signal strength is repeated for each frequency of a set of frequencies, to form a power spectral density (PSD) of the received signal, in a step 335. The set of frequencies may be a uniformly-spaced set spanning a frequency range of interest. The process is general, and may allow the user to select any set of test frequencies or other signal patterns (eg. a frequency chirp).

The process of forming a PSD may be repeated at any arrival angles of interest in a loop represented by steps 340 and 345, over a set of beam directions, to form a corresponding set of PSDs. The looping over directions may be conducted in one direction, e.g., over a range of azimuth angles, for a one-dimensional array antenna (e.g., an array or large ground-based receiving antennas operating at relatively long wavelengths) or it may be a two-dimensional scan, e.g., it may involve looping, in an inner loop, over a range of azimuth angles, and looping, in an outer loop, over a range of elevation angles. From this set of PSDs a maximum value may be selected, corresponding to the direction and frequency of the highest-power signal received by the array antenna. In this manner, the processing unit identifies a direction and frequency for which a measure of the magnitude of the signal (and a measure of the magnitude of the linear combination) is greatest. The measure of magnitude may be the power (the sum of the squares of the coefficients) or it may be another measure, such as the square root of the power.

Figure 4A:
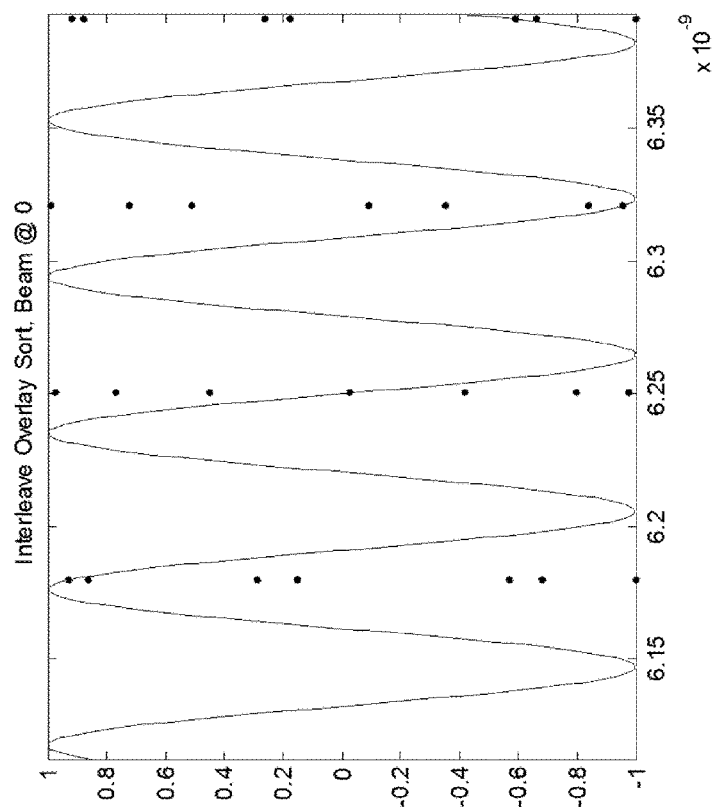
FIG. 4A is a graph, from a simulation, of a received signal and samples of the received signal, delayed for a hypothesized beam direction of 0 degrees, according to an embodiment of the present invention.

Referring to FIG. 4A, in one embodiment a simulated signal is incident from an angle of −30 degrees from a direction normal to the array results, resulting in the simulated series of points shown. In this example undersampling is employed at a rate $\frac{1}{4}^{th}$ the Nyquist frequency. The simulated signal is a tone at 3.4 times the Nyquist frequency. In related art embodiments, sampling below the Nyquist rate may result in replicas of the sampled signal.

In FIG. 4A, no adjustment to sampling times is made (equivalent to a hypothesized angle of arrival of normal to the array), so the points from the respective elements have a common set of sampling times. An overlay of a sinusoid at the frequency of the arriving signal shows no correlation with the set of points. Each element samples a different phase of the incoming signal at 30 degrees; as a result the sample amplitude values are different.

Figure 4B:
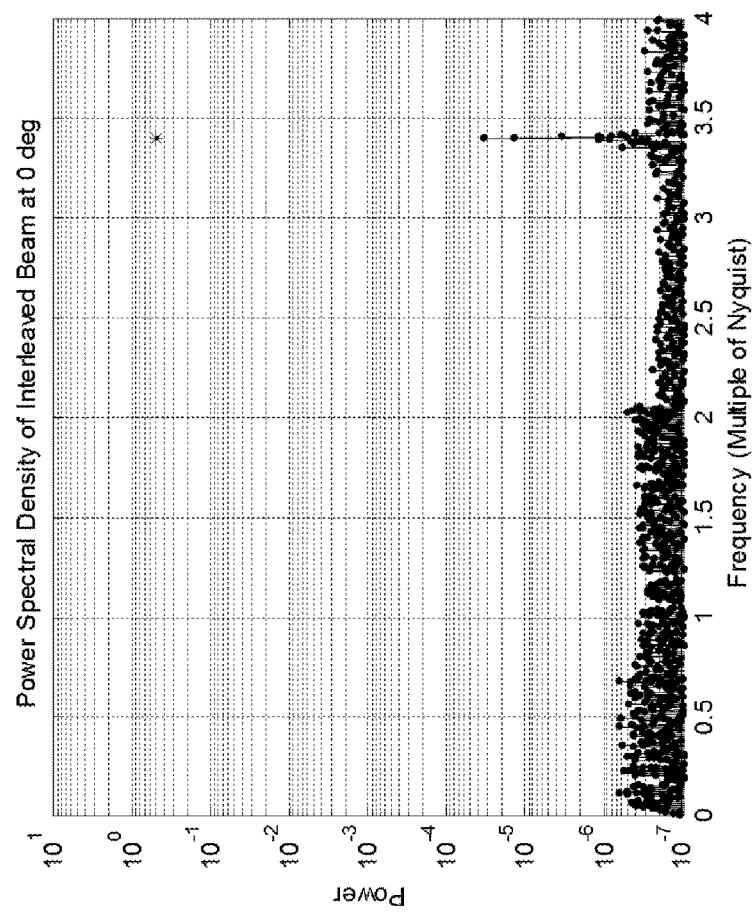
FIG. 4B is a graph, from a simulation, of a calculated power spectral density corresponding to the beam direction of FIG. 4A, according to an embodiment of the present invention.

Fitting to this time series with a set of sines and cosines corresponding to a set of frequencies ranging from 0 to 4 times the Nyquist frequency results in the measured PSD shown in FIG. 4B, which shows a very small peak at the correct frequency of 3.4 times the Nyquist frequency.

Figure 5A:
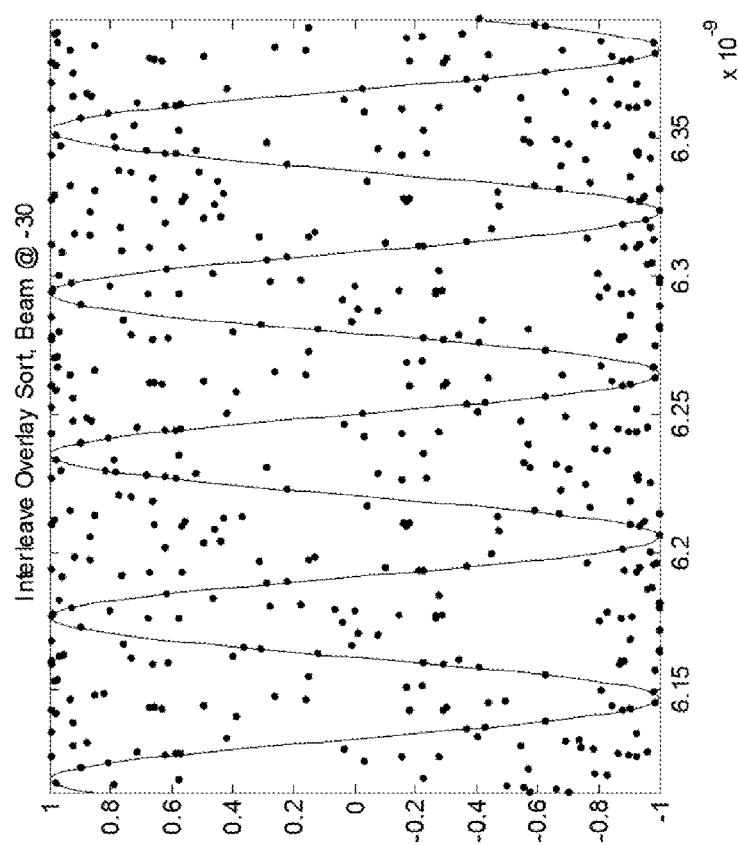
FIG. 5A is a graph, from a simulation, of a received signal and samples of the received signal, delayed for a hypothesized beam direction of −30 degrees, according to an embodiment of the present invention.
Figure 5B:
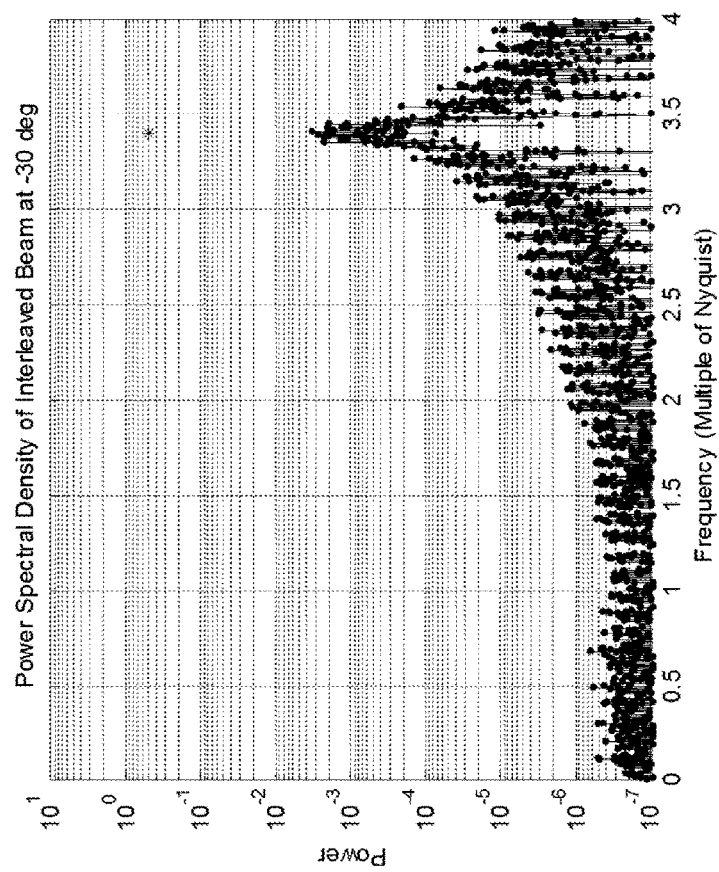
FIG. 5B is a graph, from a simulation, of a calculated power spectral density corresponding to the beam direction of FIG. 5A, according to an embodiment of the present invention.

Referring to FIG. 5A, the signal incident from an angle of 30 degrees from a direction normal to the array results, in another simulation, in the series of points shown when the hypothesized beam direction and accordant time adjustment corresponds to −30 degrees. The time delays for each antenna element 105 are now different. In the interleaved and collapsed time series the delayed samples are scattered over the area of the graph. Fitting to this time series with a set of sines and cosines corresponding to a set of frequencies ranging from 0 to 4 times the Nyquist frequency results in the measured PSD shown in FIG. 5B, which also shows a small peak at the correct frequency of 3.4 times the Nyquist frequency.

Figure 6A:
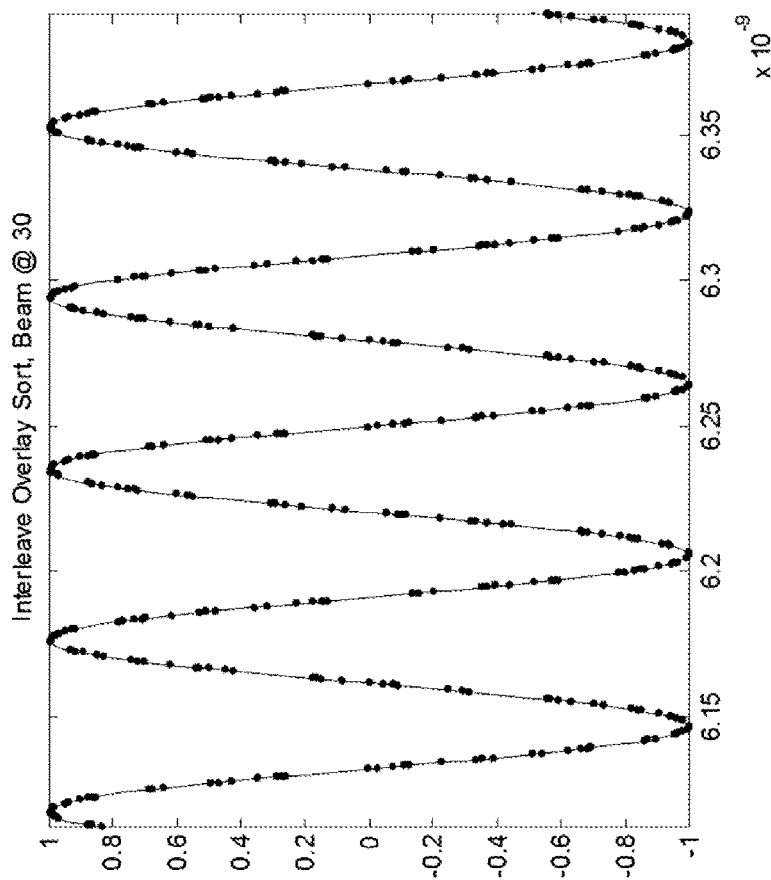
FIG. 6A is a graph, from a simulation, of a received signal and samples of the received signal, delayed for a hypothesized beam direction of 0 degrees, according to an embodiment of the present invention.
Figure 6B:
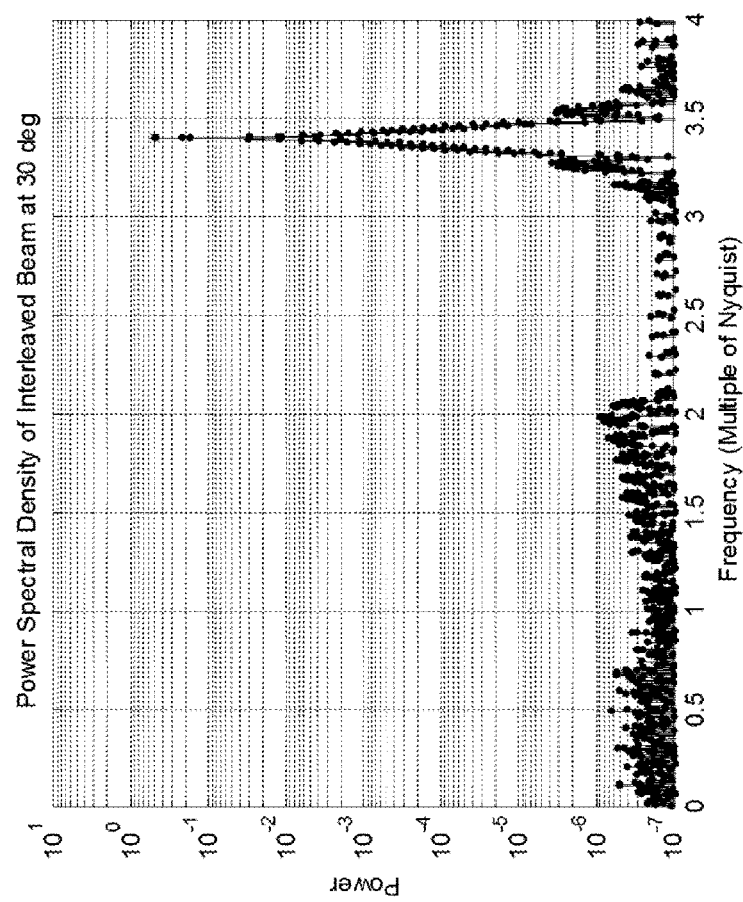
FIG. 6B is a graph, from a simulation, of a calculated power spectral density corresponding to the beam direction of FIG. 6A, according to an embodiment of the present invention.

Referring to FIG. 6A, in one embodiment a signal incident from an angle of 30 degrees from a direction normal to the array results, in another simulation, in the series of points shown when the hypothesized beam direction is 30 degrees (i.e., in the direction of the incident signal). In this case the delaying of the samples and their interleaving results in a set of points closely approximating the sinusoid that may result if the signal received at one element is sampled at a significantly larger number of (non-uniformly spaced) times points, because for this hypothesized beam direction samples from all antenna elements 105 are delayed by an amount that compensates for the difference in travel time for an electromagnetic free-space plane wave arriving from a direction that is 30 degrees from the normal to the antenna array. Fitting to this time series with a set of sines and cosines corresponding to a set of frequencies ranging from 0 to 4 times the Nyquist frequency results in the measured PSD shown in FIG. 6B, which shows a large peak at a frequency of 3.4 times the Nyquist frequency, with a peak power spectral density more than 100 times greater than that of the peaks of FIGS. 4B and 5B. It is noteworthy that there are no replicas (aliases) anywhere in the spectrum shown in either FIG. 4B or in FIG. 5B or in FIG. 6B.

The graphs of FIGS. 4A-6B were obtained from simulations of a system with 120 antenna elements 105 in a one-dimensional array antenna, the center of each element separated from the center of each neighboring element by 1 cm. In the simulations each time record was generated by sampling each element 512 times. An average sample rate of 10 billion samples per second was simulated. The Nyuist frequency corresponding to this sample rate is 5 GHz (i.e. 5E9 Hz). A received free-space signal at a frequency 3.4 times the Nyquist frequency, at 30° from broadside of the array was simulated, with no frequency conversion, so that subsampling of the received signal was simulated. No noise was simulated for FIGS. 4A-6B. However, each element employed non-uniform sampling.

The time series formed by collapsing and interleaving the delayed sampled values from the antenna elements 105 may consist of adjusted data points that are non-uniformly spaced in time.

It may also be non-uniform as a result of non-uniform sampling in the digitizer 125. This non-uniform sampling may be the result of naturally occurring clock jitter caused for example by imperfections or noise in the sampling time controller 135. In other embodiments each sampling clock signal generated by the sampling time controller 135 is intentionally jittered or otherwise caused to vary from uniformity, so that each analog to digital converter 130 samples the data at non-uniform points in time.

Unlike some related art methods of estimating the frequency content (e.g., a PSD) of a signal, the above-described method does not require that the samples of the signal be uniformly spaced in time. Thus, embodiments of the present invention may be used with samples from undersampled signals or with samples from critically sampled signals, and with uniformly sampled or non-uniformly sampled signals. Moreover, non-uniform sampling, in addition to being accommodated by embodiments of the present invention, may carry certain benefits.

A signal at a true frequency, $f_T$, that is uniformly sampled at a sample rate of $F_s$, but undersampled, would expect to have replicas at in the reconstructed PSD at frequencies $f_A$, per equation (1) below, where $M_i$ are integers from 1 to N, where N is undersampling rate (e.g. ¼$^{th}$ Nyquist rate would have N of 4).

$$f_A = M_i F_s \pm f_T \qquad (1)$$

Similar benefits may be realized if the sampling time has sufficient naturally occurring jitter. Thus, embodiments of the present invention may be used with any combination of (i) critically sampled or under sampled data, and (ii) uniformly or non-uniformly sampled data, and embodiments of the invention may be particularly beneficial for data that are under sampled and non-uniformly sampled. The combination of non-uniform undersampling and detection of signal power at angles and frequencies of interest described above may result in no aliases being detected or otherwise reported.

The variation in sampling time may be added to the per-element delay before the samples are interleaved and collapsed into a time series. If the jitter is naturally occurring, then it may be measured relative to uniform, ideal sampling, e.g., employing a method such as that disclosed in the '472 Patent. For example, the jitter of a clock may be measured by using the clock as the input to a direct digital synthesizer generating a sine wave at a reference frequency, and also using the clock to sample, with a sample and hold circuit, a reference oscillator operating at the reference frequency. The output of the direct digital synthesizer may then be subtracted from the output of the sample and hold circuit, and the difference may have an amplitude proportional to the timing offset, for small offsets, between the clock and the reference oscillator.

In one embodiment, the sampling times of the analog to digital converters 130 are all jittered simultaneously with the same timing offset applied at each clock edge. This may be accomplished for example, by connecting all of the analog to digital converters 130 to a common sampling clock via a clock tree, and applying timing jitter to the common sampling clock. If the sampling clock is a voltage-controlled oscillator, for example, or is based on a voltage-controlled oscillator (e.g., if it is a phase-locked loop including a voltage-controlled oscillator) then the output of a noise source may be connected to the control input of the voltage-controlled oscillator or added to the output of the phase detector of the phase-locked loop. The noise source may be a noise diode biased with a suitable bias current, together with a suitable amplifier or attenuator, to generate, e.g., Gaussian uncorrelated noise. In other embodiments a noise source may be connected to a voltage-controlled delay circuit connected to the output of the sampling clock. The voltage-controlled delay circuit may be, or may be based on, a shunt connected or series connected varactor diode. In other embodiments the noise (and the corresponding timing jitter) may be non-Gaussian and may have, for example, a probability density function that is approximately uniformly over an interval, e.g., as a result of processing the output of the noise source with a nonlinear circuit the output of which is a function of the input, the function being a cumulative normal distribution function.

Figure 7A:
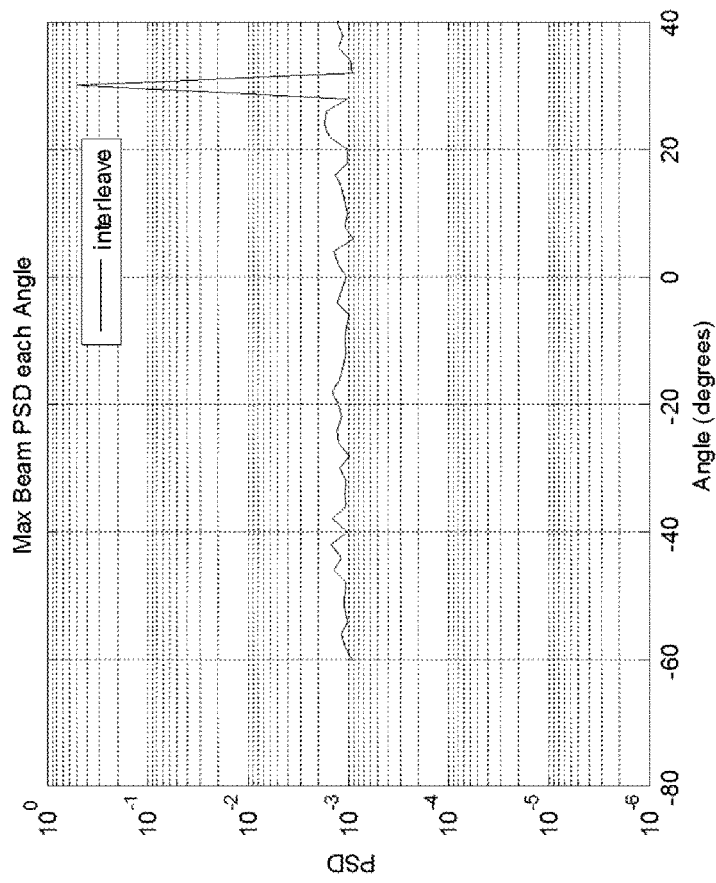
FIG. 7A is a graph, as a function of angle, from a simulation, of the maximum value of the power spectral density in a simulation using jittered uniform sampling, according to an embodiment of the present invention.
Figure 7B:
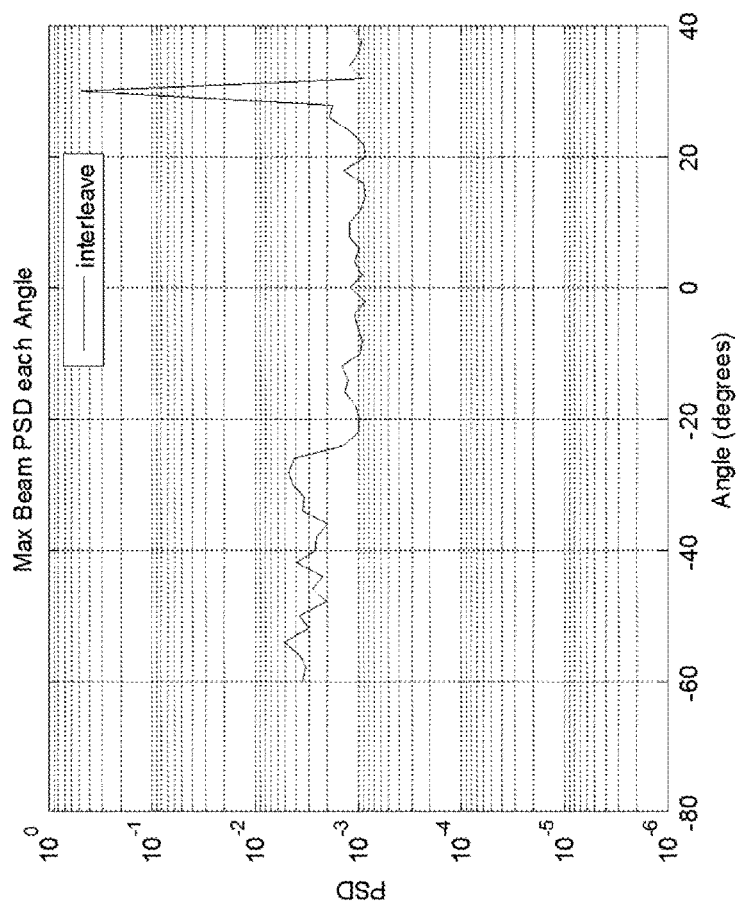
FIG. 7B is a graph, as a function of angle, from a simulation, of the maximum value of the power spectral density in a simulation using incremental sampling, according to an embodiment of the present invention.

In another embodiment, the jitter may be incremental, i.e., the time interval between one sample and the next may increase, e.g., increase linearly, with time, from an initial minimum value until a final maximum value is reached; it may then start again or "reset" at the initial minimum value. In this manner the sampling frequency, i.e., the reciprocal of the sampling interval, may be chirped, i.e., it may increase or decrease monotonically with time between resets. FIGS. 7A and 7B show graphs, from simulations, of the maximum value of the PSD as a function of angle, when jittered uniform sampling (FIG. 7A) is employed and when incremental sampling (FIG. 7B) is employed.

Whether or not the sampling time offsets are common to all of the analog to digital converters 130, the variation in sampling time may then be measured at the output of each delay circuit as described above (for the case of naturally occurring jitter, e.g., using the methods of the '472 Patent) or it may be inferred from measurements of the output of the noise source, performed for example with an additional analog to digital converter 130. In either case the sampling time controller 135 may include, for this purpose, a circuit referred to herein as a sampling time offset estimator. The inferred sampling time offsets may then be fed to the processing unit 140.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

Although limited embodiments of a system of space time interleaved matched-filters have been specifically described and illustrated herein, many modifications and variations will be apparent to those skilled in the art. Accordingly, it is to be understood that a system of space time interleaved matched-filters employed according to principles of this invention may be embodied other than as specifically described herein. The invention is also defined in the following claims, and equivalents thereof.

What is claimed is:

1. A system for determining a direction for an electromagnetic signal, the system comprising:
   a receiving array antenna, comprising a plurality of antenna elements, each antenna element having a position in the receiving array antenna;
   a digitizer configured to receive an analog signal from each of the antenna elements, and to sample and digitize each of the analog signals to form a sequence of digitized sample values from each of the analog signals;
   a processing unit, configured to:
      receive the sequences of sample values from the digitizer;
      for each direction of a plurality of hypothesized directions of the electromagnetic signal:
         combine the sample values from the plurality of antenna elements to form a single time record, the single time record comprising the sample values, each with a respective associated sampling time, the combining comprising:
            calculating an adjusted sampling time for each of the sample values, based on at least:
               the position in the array antenna of the antenna element corresponding to the sample value; and
               the hypothesized direction of the electromagnetic signal; and
            fit the single time record with a combination of one or more functions of time.

2. The system of claim 1, wherein the processing unit is configured to fit a sine function and a cosine function to the single time record by performing a linear least squares fit.

3. The system of claim 1, wherein the processing unit is further configured to identify a direction for which a measure of the magnitude of the combination is greatest.

4. The system of claim 3, wherein the fitting of a linear combination of a sine function and a cosine function to the single time record comprises finding a coefficient for the sine function and a coefficient for the cosine function, and wherein the measure of the magnitude of the combination is the sum of:
   the square of the coefficient for the sine function, and
   the square of the coefficient for the cosine function.

5. The system of claim 3, wherein the digitizer is configured to sample and digitize each of the analog signals by:
   sampling each of the analog signals at a plurality of sampling times,
   each sampling time having a sampling time offset relative to a uniform sequence of points in time, the sampling time offset varying with time by at least 10% of the difference between a first sampling time of the plurality of sampling times and a second sampling time of the plurality of sampling times immediately following the first sampling time.

6. The system of claim 5, wherein during a first time interval, the sampling time offset increases monotonically or decreases monotonically.

7. The system of claim 5, wherein the digitizer is further configured to measure the sampling time for each sample value of each sequence of sample values, and wherein the calculation of an adjusted sampling time for each of the sample values is further based on the measured sampling time for the sample value.

8. The system of claim 5, wherein the digitizer comprises a clock and a voltage-controlled delay circuit connected to an output of the clock, the digitizer configured to sample the analog signals at sampling times corresponding to edges in a clock signal at an output of the voltage-controlled delay circuit.

9. The system of claim 8, wherein the digitizer comprises a noise source, an output of the noise source being connected to a control input voltage-controlled delay circuit.

10. The system of claim 9, wherein the digitizer further comprises a circuit configured to measure the output of the noise source and to estimate a corresponding sampling time offset.

11. The system of claim 1, wherein the processing unit is configured to fit the single time record with a set of functions corresponding to a plurality of hypothesized frequencies, and to identify power of the plurality of hypothesized frequencies corresponding to a best fit to the single time record.

12. The system of claim 1, comprising a signal chain including an antenna element of the plurality of antenna elements and connected to an input of the digitizer, the signal chain having an upper frequency and a lower frequency,
   wherein the digitizer is configured to undersample.

13. The system of claim 12, wherein the signal chain comprises an analog filter having an upper filter frequency equal to the upper frequency, and a lower filter frequency equal to the lower frequency.

14. The system of claim 12, wherein the digitizer is configured to digitize the analog signal at a plurality of sampling times including:
- a first sampling time,
- a second sampling time, and
- a third sampling time, the first sampling time, the second sampling time, and the third sampling time being consecutive, the length of the interval between the first sampling time and the second sampling time differing from the length of the interval between the second sampling time and the third sampling time by more than 10% of the length of the interval between the first sampling time and the second sampling time.

15. The system of claim 1, wherein the processing unit is configured to measure the power of signals arriving from a hypothesized direction without performing interpolation.

16. A method for determining a direction for an electromagnetic signal, the method comprising:
- receiving a plurality analog signals, from a receiving array antenna, the receiving array antenna comprising a plurality of antenna elements, each antenna element having a position in the receiving array antenna, each of the analog signals corresponding to one of the antenna elements;
- digitizing each of the analog signals at a plurality of sampling times, to form a plurality of sequences of digitized sample values, each of the sequences of sample values corresponding to one of the analog signals;
- for each direction of a plurality of hypothesized directions of the electromagnetic signal:
  - combining the sample values from the plurality of antenna elements to form a single time record, the single time record comprising the sample values, each with a respective associated sampling time, the combining comprising:
    - calculating an adjusted sampling time for each of the sample values, based on at least:
      - the position in the array antenna of the antenna element corresponding to the sample; and
      - the hypothesized direction of the electromagnetic signal; and
    - fitting the single time record with a combination of one or more functions of time.

17. The method of claim 16, further comprising identifying a direction for which a measure of the magnitude of the combination is greatest.

18. The method of claim 16, comprising processing an analog signal of the plurality analog signals with a signal chain before digitizing the analog signal, the signal chain having an upper frequency and a lower frequency,
  wherein the digitizing of the analog signal comprises digitizing the analog signal with a sampling rate less than twice the difference between the upper frequency and the lower frequency.

19. The method of claim 16, wherein the digitizing of each of the analog signals comprises:
- sampling each of the analog signals at a plurality of sampling times,
- each sampling time having a sampling time offset relative to a uniform sequence of points in time, the sampling time offset varying with time by at least 10% of the difference between a first sampling time of the plurality of sampling times and a second sampling time of the plurality of sampling times immediately following the first sampling time.

20. The method of claim 19, further comprising measuring the sampling time for each sample value of each sequence of sample values, and wherein the calculation of an adjusted sampling time for each of the sample values is further based on the measured sampling time for the sample.

* * * * *